US010908119B2

(12) United States Patent
Gervasio et al.

(10) Patent No.: US 10,908,119 B2
(45) Date of Patent: Feb. 2, 2021

(54) REFERENCE ELECTRODE FOR ELECTROCHEMICAL MEASUREMENTS AT HIGH TEMPERATURES

(71) Applicant: Arizona Board of Regents on Behalf of the University of Arizona, Tucson, AZ (US)

(72) Inventors: Dominic Gervasio, Tucson, AZ (US); Hassan Elsentriecy, Tucson, AZ (US); Perumal Pugazhendhi, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 320 days.

(21) Appl. No.: 15/778,558

(22) PCT Filed: Nov. 21, 2016

(86) PCT No.: PCT/US2016/063169
§ 371 (c)(1),
(2) Date: May 23, 2018

(87) PCT Pub. No.: WO2017/091517
PCT Pub. Date: Jun. 1, 2017

(65) Prior Publication Data
US 2020/0166476 A1    May 28, 2020

Related U.S. Application Data

(60) Provisional application No. 62/258,853, filed on Nov. 23, 2015.

(51) Int. Cl.
*G01N 27/411*    (2006.01)
*C04B 35/48*    (2006.01)
(Continued)

(52) U.S. Cl.
CPC .......... *G01N 27/4117* (2013.01); *C04B 35/48* (2013.01); *G01N 27/301* (2013.01); *G01N 27/401* (2013.01); *H01M 10/39* (2013.01)

(58) Field of Classification Search
CPC ............. G01N 27/301; G01N 27/4117; G01N 27/401; G01N 17/02
See application file for complete search history.

(56) References Cited

U.S. PATENT DOCUMENTS 3,616,407 A * 10/1971 Engell ................ G01N 27/4112
204/423
4,217,180 A    8/1980 Baxter et al.
(Continued)

FOREIGN PATENT DOCUMENTS

CN    102368059 A    3/2012
CN    104215678 A    12/2014
(Continued)

OTHER PUBLICATIONS

Hisamoto et al., "A Study of the Mechanism of Electrodeposition of Selenium from Liquid Hydrogen Chloride," from Proceedings of the Second International Symposium on Electrochemical Processing of Tailored Materials, ed. Alkire et al., Proceedings vol. 93-12, The Electrochemical Society, Inc. 1993 (Year: 1993).*
(Continued)

*Primary Examiner* — Alexander S Noguerola
(74) *Attorney, Agent, or Firm* — Blank Rome LLP (57)    ABSTRACT

A reference electrode which is stable over a wide range of temperatures, pressures and chemical conditions is provided. The subject reference electrode according to the present invention comprises a tubular enclosure composed of quartz having a distal, closed end and a proximal, open end. An insulating ceramic rod is seemingly connected to the opening in the closed distal end of the enclosure to form micro-cracks between the ceramic rod and the quartz enclo-
(Continued)

sure (called a cracked junction, CJ). The CJ gives a very tortuous path for ion conduction from inside the reference electrode (RE) to a working electrode (WE). Inside the tubular enclosure is an electrical lead (e.g., a silver wire) disposed in an electrolyte comprising a mixture of alkaline metal salts (e.g., AgCl and KCl), extending from the electrolyte upward through a sealing means at the proximal end of the quartz enclosure.

16 Claims, 12 Drawing Sheets

(51) Int. Cl.
    *G01N 27/30*         (2006.01)
    *G01N 27/401*       (2006.01)
    *H01M 10/39*       (2006.01)

(56) References Cited

U.S. PATENT DOCUMENTS

| | | | |
|---|---|---|---|
| 4,390,406 A * | 6/1983 | Kato | G01N 27/301 |
| | | | 204/435 |
| 4,414,093 A | 11/1983 | Redey et al. | |
| 4,483,785 A | 11/1984 | Johnson et al. | |
| 4,500,413 A | 2/1985 | Taylor et al. | |
| 5,234,570 A | 8/1993 | Taylor et al. | |
| 5,454,923 A | 10/1995 | Nachlas et al. | |
| 5,516,413 A | 5/1996 | Foster et al. | |
| 6,540,902 B1 * | 4/2003 | Redey | C25C 3/00 |
| | | | 205/354 |
| 7,632,384 B1 * | 12/2009 | Redey | G01N 27/416 |
| | | | 204/408 |
| 8,173,007 B2 | 5/2012 | Xu et al. | |
| 2009/0101522 A1 | 4/2009 | Xu et al. | |
| 2010/0108511 A1 | 5/2010 | Yang et al. | |
| 2012/0176147 A1 | 7/2012 | Hefner et al. | |

FOREIGN PATENT DOCUMENTS

| | | | | |
|---|---|---|---|---|
| CN | 104297311 A | | 1/2015 | |
| JP | 04-052552 A | * | 2/1992 | ............. G01N 27/30 |
| WO | WO 2009/055092 A1 | * | 4/2009 | ........... G01N 27/401 |

OTHER PUBLICATIONS

Agrawal et al., "Technical Note: A Silver-Silver Chloride Reference Electrode for the High Temperature and High Pressure Electrochemistry," Corrosion-NACE, vol. 33, No. 11, Nov. 1977, pp. 418-419 (Year: 1977).*
JPO machine-generated English language translation of Denpo et al. JP 04-052552 A (Year: 1992).*
Park et al., A Quartz Tube Based $Ag/Ag^+$ Reference Electrode with a Tungsten Tip Junction for an Electrochemical Study in Molten Salts, Bull. Korean Chem., Soc. 2009, vol. No. 1.
Gao et al., A Quartz Sealed Ag/AgCl Reference Electrode for $CaCl_2$ Based Molten Salts, Journal of Electroanalytical Chemistry, 579, 2005, 321-328.
Supplementary European Search Report of European Application No. EP16869139.
Wei et al., "Current Rectification at Quartz Nanopipet Electrodes", Anal. Chem. 1997, 69, pp. 4627-4633.
Morishita et al., "Carbon-coated tungsten and molybdenum carbides for electrode of electrochemical capacitor", Electrochimica Acta 52, 2007, pp. 2478-2484.

* cited by examiner

REFERENCE ELECTRODE FOR ELECTROCHEMICAL MEASUREMENTS AT HIGH TEMPERATURES

RELATED APPLICATIONS

This application is a national phase application of PCT/US2016/063169, filed Nov. 21, 2016, which claims priority to U.S. Provisional Application No. 62/258,853, filed Nov. 23, 2015. The entire contents of those applications are incorporated herein by reference.

STATEMENT REGARDING FEDERALLY SPONSORED RESEARCH

The government has rights in this invention pursuant to contract No. DE-EE0005942 Funded by Department of Energy.

BACKGROUND OF THE INVENTION

Field of the Invention

The present invention relates to a reference electrode for use at high temperatures up to 1000° C.

Description of Related Art

A reference electrode (RE) is an electrode in an ionic conducting solution, called a half-cell, with a constant electrode potential. The reference electrode is connected by salt bridge to second half-cell with another electrode, called a working electrode (WE), and voltage (potential difference) is measured between the RE and WE to find the potential at the working electrode versus the reference-electrode potential.

The RE is an essential component in an electrochemical cell to quantitatively observe behavior of the working electrode. A steady current can be passed between the working electrode and another electrode called a counter electrode (CE) while the WE potential is measured versus the RE. This can be repeated for a number of currents between the We and CE. In this way, a plot of WE current versus WE potential (called the polarization of the working electrode) can be made, and the corrosion rate of a working metal electrode can be determined this plot of WE current as a function of WE potential.

SUMMARY OF THE INVENTION

A stable and robust reference electrode according to the present invention has been made from a metal wire (like silver wire, Ag-wire) in contact with its ionic metal salt (like silver chloride, $Ag^+Cl^-$) and an alkaline metal salt (like potassium chloride, KCl) inside a quartz tube with an insulating ceramic rod (like alumina or zirconia rod) melted into one end of the quartz tube so that micro-cracks form between the ceramic rod and quartz (called a cracked junction, CJ). The CJ gives a very tortuous path for ion conduction from inside the quartz tube to outside the tube.

This reference electrode of the present invention has been calibrated and used for quantitatively estimating the electrochemical corrosion of Hastelloy C-276 in a zinc eutectic molten salt ($18.6NaCl-21.9KCl-59.5ZnCl_2$ mol %, MP=213° C.) equilibrated with air at temperatures up to 900° C. In the electrochemical polarization experiment, the metal is immersed in molten salt equilibrated with air (or Argon for anaerobic tests) along with counter and reference electrodes for about 10 minutes to determine the open circuit potential (OCP) of the alloy versus the reference electrode. Then the test alloy is polarized from −30 mV from the OCP to +30 mV above OCP. The reference electrode must have a stable potential (be ideally non-polarizable), must be stable over a wide range of temperatures up to 900° C., even as high as 1300° C., for corrosion studies of alloys in molten salts and should not perturb the alloy sample or molten salt under test.

Figure 1:
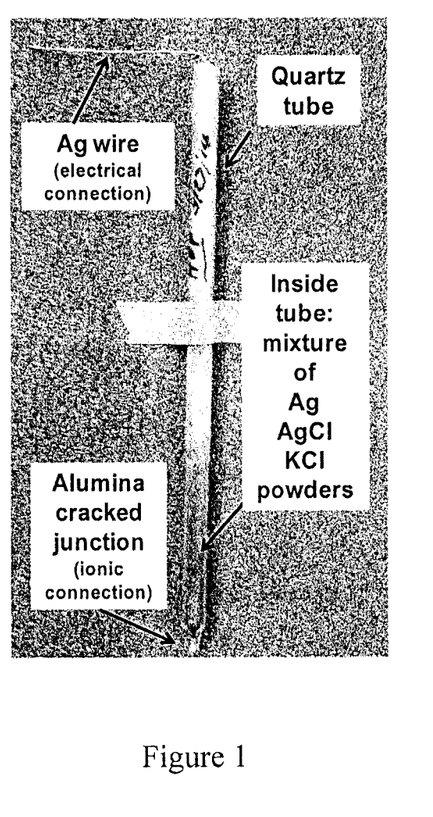
FIG. 1 is a depiction of a high-temperature alumina cracked junction reference electrode according to the present invention.
Figure 2:
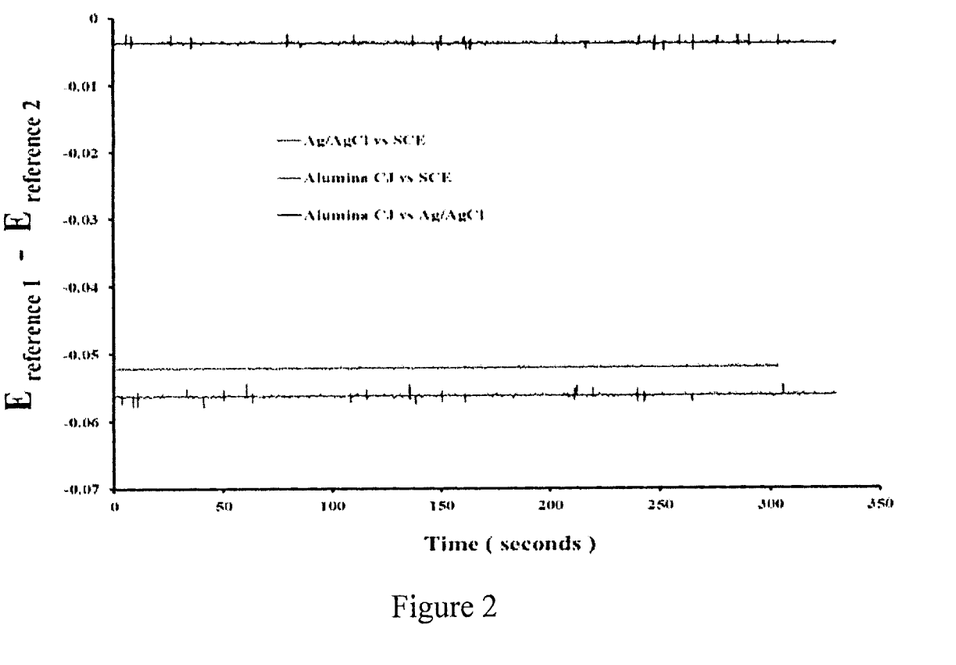
FIG. 2 is a graph depicting differences in potential in time for the cracked junction (CJ) electrode, the saturated calomel electrode (SCE) and the saturated silver/silver chloride electrode (Ag/AgCl or SSE). Electrode to left is "high" and electrode on right is "low" on a meter (saturated means the aqueous phase is equilibrated and in contact with solid KCl)

In one embodiment, the housing is made of quartz so that the reference electrode could be used at temperatures up to 900° C. The quartz tube was terminated with a "cracked junction" (CJ) for ionic connection between the reference electrode and the working electrode (test alloy) of the electrochemical cell. This quartz tube was filled with proper amounts of 1 part Ag metal powder, 1 part AgCl powder and 1 part KCl powder which were mixed well by grinding and then poured into the quartz tube. A silver wire was inserted almost completely down the tube for electrical connection as shown in FIG. 1. The CJ was made by fusing the quartz tube over an alumina rod so that the rod was firmly held in place as if sealed into the quartz. However due to difference in expansion coefficients of the alumina and quartz, micro cracks form at the quartz and alumina interface resulting in a very tortuous path for ion diffusion between the inside of the quartz tube containing the reference electrode and the outside which gives ionic contact to the electrochemical cell. This reference electrode, shown in FIG. 1, is referred to as the Alumina CJ.

DESCRIPTION OF THE INVENTION

A reference electrode according to the present invention is used in order to measure the potential of a metal sample in molten salt at high temperatures (up to 900° C. or more). A metal in contact with its cationic salt has constant potential and is the basis for making a reference electrode. The new reference electrode used in molten salt was developed to simulate the traditional silver/silver chloride (Ag/AgCl) reference electrode (SSE) used in aqueous solutions. The new RE has a sliver wire inserted into a mixture of chemicals (Ag metal powder+AgCl+KCl) housed in a quartz tube with a ceramic rod (Zirconia) sealed at the bottom making a cracked junction for ion conduction needed to complete the electronic circuit for measuring and controlling potential of a metal sample in molten salt at high temperatures (up to 900° C. or more). The main improvement in this reference electrode is that a zirconia rod was melted into one end of heavy-walled walled quartz tubing was used to form the cracked junction. This is much more stable than thin walled quartz and alumina.

In another embodiment, a combination of metal and metal-cationic salt was used to make another reference electrode, a copper/cuprous chloride reference electrode (CCE). In the CCE, a copper wire is inserted into a mixture of chemicals (Cu+CuCl+KCl) housed in a quartz tube terminating with a sealed ceramic rod (Zirconia) at the bottom of the tube. The zirconia sealed in quartz has a tortuous crack for ionic exchange between the reference chamber and main chamber of salt holding the electrode under test. This ion exchange is needed in order to complete the electrical connection between the reference electrode (RE) and the working electrode (WE) under test in the molten salt, so the potential of the working electrode under test can be measured and controlled during the electrochemical polarization measurements of the WE under test.

Example 1

Figure 3:
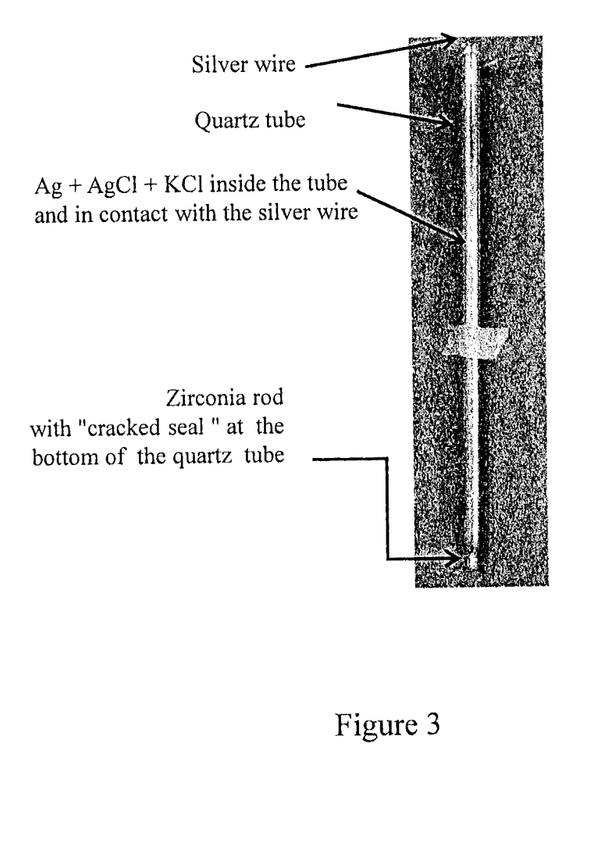
FIG. 3 is a depiction of a newly-prepared silver/silver chloride electrode (SSE) in quartz housing with a zirconia rod forming a cracked junction.
Figure 4:
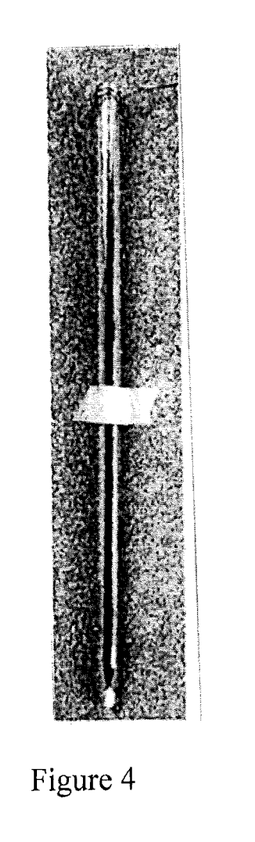
FIG. 4 is a depiction of a newly prepared copper/cuprous chloride electrode (CCE) in quartz housing.

Testing the potential of the new reference electrodes in saturated aqueous KCl. To verify that these new combinations (FIGS. 3 and 4) can serve as reference electrodes, their potential was measured against the well-known standard saturated calomel reference electrode (SCE) in aqueous saturated potassium chloride solution.

Figure 5:
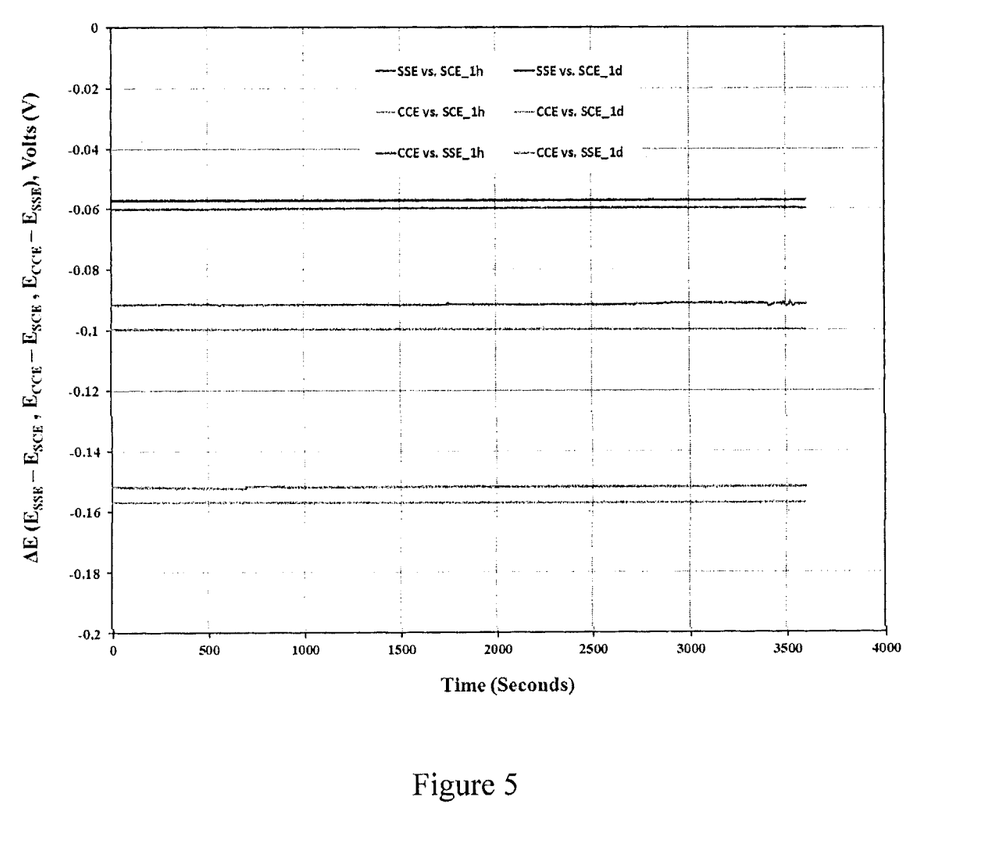
FIG. 5 is a graph showing the change in potential differences (E) as a function of time of SSE and CCE versus SCE and CCE in sat. KCl solution at room temperature.

FIG. 5 shows a plot of the time dependence of the potential difference (ΔE) measured in aqueous saturated KCl solution at room temperature for SSE versus SCE, CCE versus SCE and the CCE versus SSE. As shown in FIG. 5, the proposed reference electrodes (SSE and CCE) showed the expected ΔE values versus the SCE (based on thermodynamic calculations) after 1 h and 24 h of immersion in sat. KCl solution. Moreover, the ΔE values are essentially constant throughout the immersion time. The ΔE values are summarized in Table 1.

TABLE 1

Potential differences (ΔE) between different electrodes in sat. KCl solution.

| ΔE | 1 h immersion | 24 h immersion | Standard value |
|---|---|---|---|
| SSE - SCE | −59 mV | −57 mV | −45 mV |
| CCE - SCE | −151 mV | −156 mV | −145 mV |
| CCE - SSE | −91 mV | −99 mV | −101 mV |

This data confirms that these proposed electrodes (SSE and CCE) can serve as reference electrodes in aqueous solutions as the SCE does.

Example 2

Figure 6:
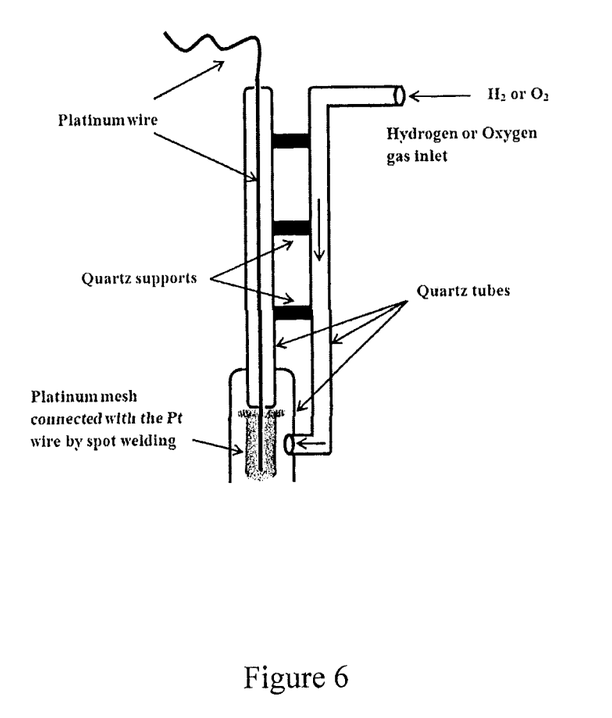
FIG. 6 is a depiction of a reversible hydrogen (RHE) and reversible oxygen electrode (ROE) used to measure the relative electrode potential of the SSE and CCE.

Testing the potential of the proposed electrodes in NaCl—KCl—ZnCl$_2$ (M.P.: 204° C.) at high temperatures. The potentials of the new electrodes (SSE and CCE) were measured against reversible gas electrodes. These gas electrodes are the reversible hydrogen electrode (RHE) and reversible oxygen electrode (ROE). A platinum wire was welded to platinum-mesh in molten salt, which was housed in quartz, and hydrogen (or oxygen) gas was sent in the quartz housing at a flow rate of 90 SCCM as shown in FIG. 6. The gas was sent to the Pt wire in a quartz housing as dry gas or pre-saturated with DI water by passing the gas through a gas wash bottle at room temperature.

TABLE 2

Potential differences (ΔE) between SSE, CCE, RHE and ROE under different conditions and temperatures

| | T (° C.) | | | | | | Standard Δ E at |
|---|---|---|---|---|---|---|---|
| ΔE (mV) | 250° C. | 300° C. | 350° C. | 400° C. | 500° C. | 800° C. | 25° C. (mV) |
| SSE vs. RHE (dry H$_2$) | +294 | +370 | +396 | +463 | | | +225 |
| SSE vs. RHE (H$_2$/H$_2$O) | +230 | +238 | +241 | +237 | | | +225 |
| CCE vs. RHE (dry H$_2$) | +160 | +206 | +269 | +280 | | | +124 |
| CCE vs. RHE (H$_2$/H$_2$O) | +94 | +102 | +96 | +62 | | | +124 |
| SSE vs. ROE (dry O$_2$) | −403 | | −190 | −165 | | | −1005 |
| SSE vs. ROE (O$_2$/H$_2$O) | −775 | | −814 | −806 | | | −1005 |
| CCE vs. ROE (dry O$_2$) | −560 | | −370 | −348 | | | −1106 |
| CCE vs. ROE (O$_2$/H$_2$0) | −935 | | −968 | −987 | | | −1106 |
| CCE vs. SSE | −135 | −142 | −150 | −163 | −182 | −225 | −100 |

Measuring the voltage (ΔE) of a first reference electrode with a known potential ($E^{RE1\ known}$) against the potential of second electrode ($E^{RE2\ unknown}$) is done to see if the potential difference (ΔE) is constant, which establishes the suitability of this electrode (RE2) as a reference electrode [see Electroanalytical Chemistry, James J. Lingane, 2nd edition, Interscience Publishers (1958)] and to establish the potential of the second electrode (RE2).

Following this method, the potential differences shown in Table 2 were found to be constant in time and the measured potentials are in fairly good agreement with the thermodynamically expected potential differences (ΔE) calculated from the calorimetric data for the free energy (ΔG) of formation of the various materials. The small observed deviations are quite reasonable since the tabulated thermodynamic data do not take into account interactions between the various materials (Ag, AgCl, KCl, Cu, CuCl, etc.) and the molten salt. So the various electrodes in Table 2 are found to be suitable as reference electrodes.

The silver/silver chloride electrode used for this work can certainly be used as reference electrode to determine and control potential of a metal under test during an electrochemical determination of the corrosion rate of a metal in a molten salt at temperatures up to 800° C.

Example 3

Figure 7:
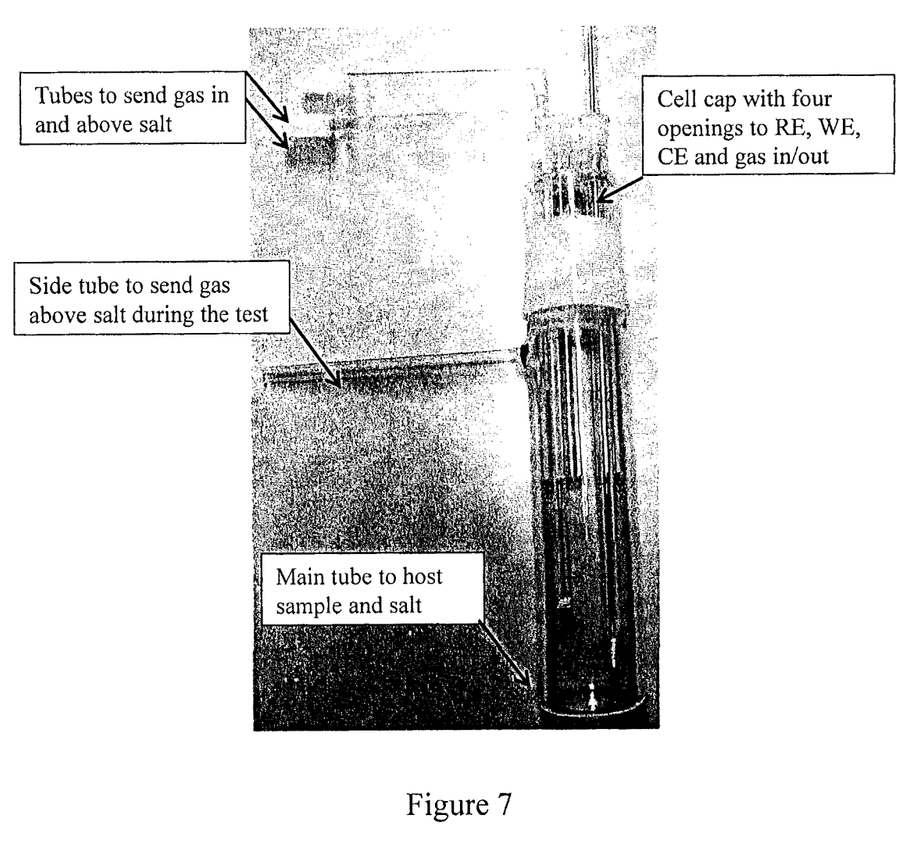
FIG. 7 is a depiction of a quartz housing for an electrochemical reversible gas half-cell.

Electrochemical determination of corrosion rates. The metal alloy used in all electrochemical corrosion rate determinations was Hastelloy C-276. Mass of the molten salt used during all electrochemical experiments was 150 gm. The metal sample was abraded on wet or dry 600 grit SiC paper, rinsed with deionized (DI) water and then rinsed with acetone. The electrochemical corrosion cell was made of quartz with specific dimensions to fit into an electrical furnace used to isothermally control temperature during all tests. FIG. 7 shows the electrochemical corrosion cell used.

Figure 8:
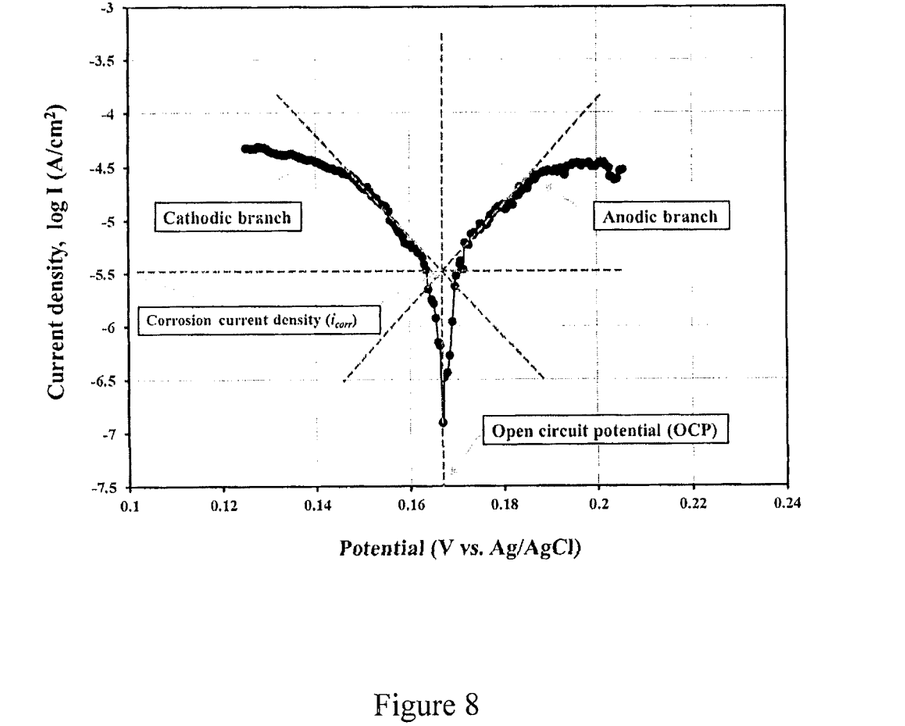
FIG. 8 is a graph showing a linear polarization curve showing how to calculate the corrosion current density (i)

The electrochemical test of metal corrosion was carried out by using the linear polarization technique. In this technique, the metal sample was polarized ±30 mV versus the open circuit potential (OCP) at a scan rate 0.2 mV/s. The potential of the metal under test started from the most cathodic value and was scanned to the most positive value, giving a linear polarization (I/V) curve. The measured linear polarization (I/V) curve was transformed to a log 10 of the absolute value of the current plotted versus the potential, and this gave a plot that was used to calculate the corrosion current density ($i_{corr}$) as shown in FIG. 8.

The corrosion rates were determined from the corrosion current density by using the formula derived from Faraday's Law, which is given by ASTM Standards G59 and G102 (ASTM International, 2003):

$$CR\ (\mu m/y) = \frac{k_1 * i_{corr} * EW}{\rho}$$

where $K_1=3.27$ in $\mu m\ g\ \mu A^{-1}\ cm^{-1}\ yr^{-1}$, $i_{corr}$ is the corrosion current density in $\mu A\ cm^{-2}$ (determined from the polarization curve, FIG. 22), EW and ρ are the equivalent weight (27.01 g/eq) and density (8.89 g cm$^{-3}$) of the C-276 Hastelloy, respectively.

Example 4

Electrochemical corrosion rate measurements in NaCl—KCl—ZnCl$_2$ (molar composition, 13.4-33.7-52.9, M.P.=204° C.). In these corrosion tests in aerobic molten salt, the electrochemical corrosion cell was kept open to the atmospheric air all the time. The salt was melted at 300° C. for 30 min, then a metal sample was inserted at this temperature (300° C.). After reaching a stable OCP (about 5 min after samples insertion), the polarization (I-V) curve was measured. After measuring the I-V curve at 300° C., the temperature was raised to 500° C. and after reaching a stable OCP, an I/V curve was measured at this temperature (500° C.). The same procedure was used to measure the I/V curve at 800° C. Two different sizes of samples in the same mass of salt (150 gm) was used to investigate the effect of sample size on the corrosion rate.

Figure 9:
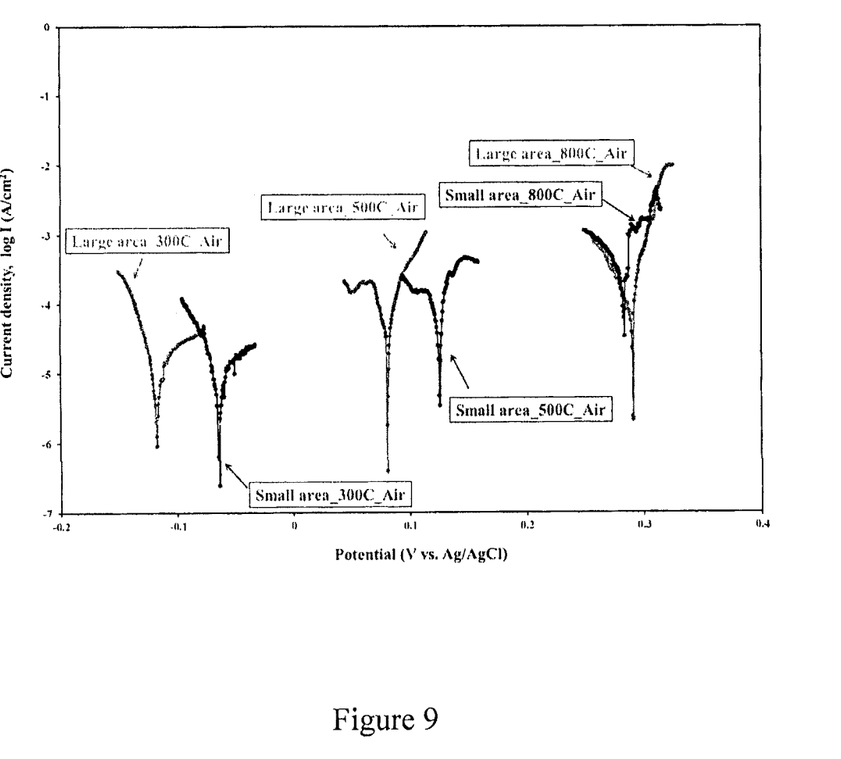
FIG. 9 is a graph showing a comparison of polarization curves of C-276 Hastelloy samples in 150 gm of $NaCl-KCl-ZnCl_2$ salt at different temperatures in air.

As shown in FIG. 9, as expected from the Arrhenius equation with no change of mechanism, the polarization currents increase with an increase in temperature. In addition there is a clear positive shift in the OCP with increase in temperature due to higher oxygen concentration on the metal surface due to better transport of oxygen from air due to lower viscosity of the molten salt and higher permeability of oxygen in the molten salt.

TABLE 3

Corrosion parameters obtained from polarization curves in FIG. 23.

| Temperature (° C.)/ Atmosphere | Surface area for WE and CE | Corrosion potential, $E_{corr}$ (V) | Corrosion current density, $I_{corr}$ (μA/cm$^2$) | Corrosion rate, (μm/y) |
|---|---|---|---|---|
| 300 (Small) . . . Air | WE = 5.6 cm2 CE = 10.5 cm2 | −0.065 | 3.98 | 39.52 |
| 300 (Large) . . . Air | WE = 17.5 cm2 CE = 27.3 cm2 | −0.115 | 5 | 49.65 |
| 500 (Small) . . . Air | WE = 5.6 cm2 CE = 10.5 cm2 | 0.125 | 39.8 | 395.21 |
| 500 (Large) . . . Air | WE = 17.5 cm2 CE = 27.3 cm2 | 0.08 | 43.6 | 432.94 |
| 800 (Small) . . . Air | WE = 5.6 cm2 CE = 10.5 cm2 | 0.284 | 251 | 2492.43 |
| 800 (Large) . . . Air | WE = 17.5 cm2 CE = 27.3 cm2 | 0.291 | 239.88 | 2382 |

As shown in the table 3, the corrosion rates of the small size sample are very similar to those of the large size sample which suggests that there is no dependency of corrosion rate on the metal coupon size when holding the mass of the molten salt constant.

Example 5

Aerobic electrochemical tests at 800° C. with flowing dry air in the molten salt. The salt was heated to melt at 500° C., then the dry air was sent into the salt at 175 SCCM for 1 h, then the temperature was raised to 800° C. while dry air was still bubbling in the salt. Then the samples (CE and WE) were inserted (the temperature was kept at 800° C.) and the dry air bubbling stopped in the salt and started above the salt, and after the OCP became stable (about 5 min after sample insertion) then the I-V curve was measured for metal coupon in the molten salt equilibrated with dry air.

TABLE 4

Comparison of corrosion parameters of C-276 Hastelloy samples in NaCl—KCl—ZnCl$_2$ salt at 800° C. when the cell is open to air or under flowing of dry air.

| Temperature (° C.)/ Atmosphere | Surface area for WE and CE | Corrosion potential, $E_{corr}$ (V) | Corrosion current density, $I_{corr}$ (μA/cm$^2$) | Corrosion rate, (μm/y) |
|---|---|---|---|---|
| 800 / Cell open to air | WE = 17.5 cm$^2$ CE = 27.3 cm$^2$ | 0.291 | 239.88 | 2382 |

TABLE 4-continued

Comparison of corrosion parameters of C-276 Hastelloy samples in NaCl—KCl—ZnCl$_2$ salt at 800° C. when the cell is open to air or under flowing of dry air.

| Temperature (° C.)/ Atmosphere | Surface area for WE and CE | Corrosion potential, $E_{corr}$ (V) | Corrosion current density, $I_{corr}$ (μA/cm$^2$) | Corrosion rate, (μm/y) |
|---|---|---|---|---|
| 800 / Dry air | WE = 11.2 cm$^2$ CE = 21.7 cm$^2$ | 0.23 | 223.87 | 2223 |

Figure 10:
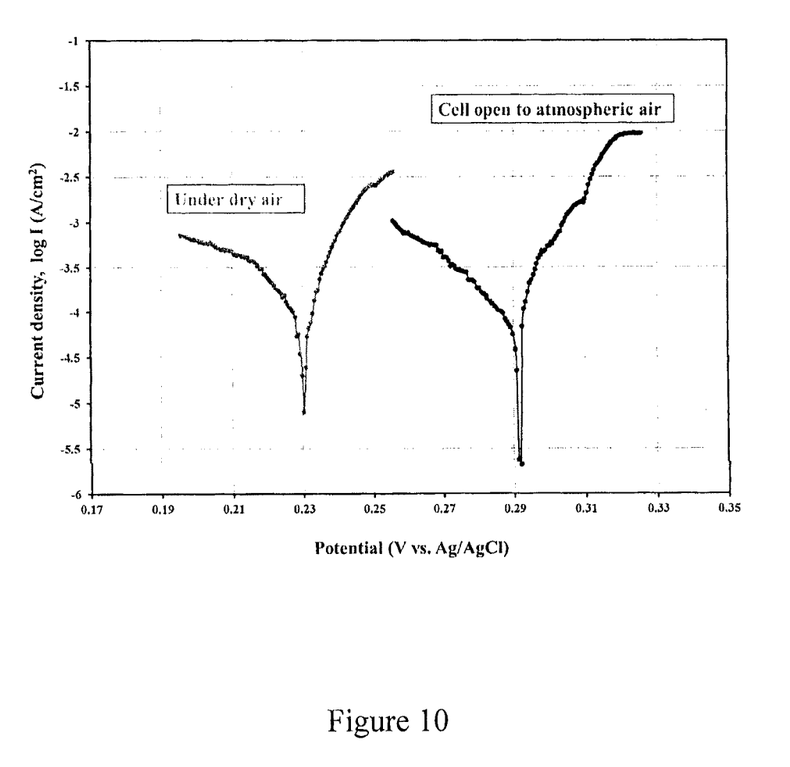
FIG. 10 is a graph showing a comparison of polarization curves of C-276 Hastelloy samples in $NaCl-KCl-ZnCl_2$ salt at 800° C. when the cell is open to air or under flowing of dry air.

As shown from FIG. 10 and Table 4, the corrosion rate under flowing of dry air is very close to the corrosion rate when the cell was kept open to air. This indicates that the corrosion process was mainly driven by oxygen reduction (as the main cathodic reaction) in both cases.

Example 6

Anaerobic electrochemical tests. For anaerobic electrochemical corrosion testing, the salt was heated to melt at 300° C., then Argon gas was flowed into the salt at 175 SCCM for 30 min before inserting the counter and working electrode Hastelloy metal samples. When the CE and WE samples were inserted, the gas bubbling into the molten salt was stopped, and instead gas was flowed above the salt, and after the OCP became stable (about 5 min after sample insertion), then the I-V curve was measured. After the first I/V curve was acquired at 300° C., the argon gas was again flowed into the salt until the temperature reached 500° C. Then the argon flow was switched again to over the salt. After the OCP was stable, the I-V curve was measured at 500° C. The same procedure was used for acquiring the I/V curve at 800° C. The metal samples remained in the molten salt since they were first inserted at 300° C. and until tests were finished at 800° C.

Figure 11:
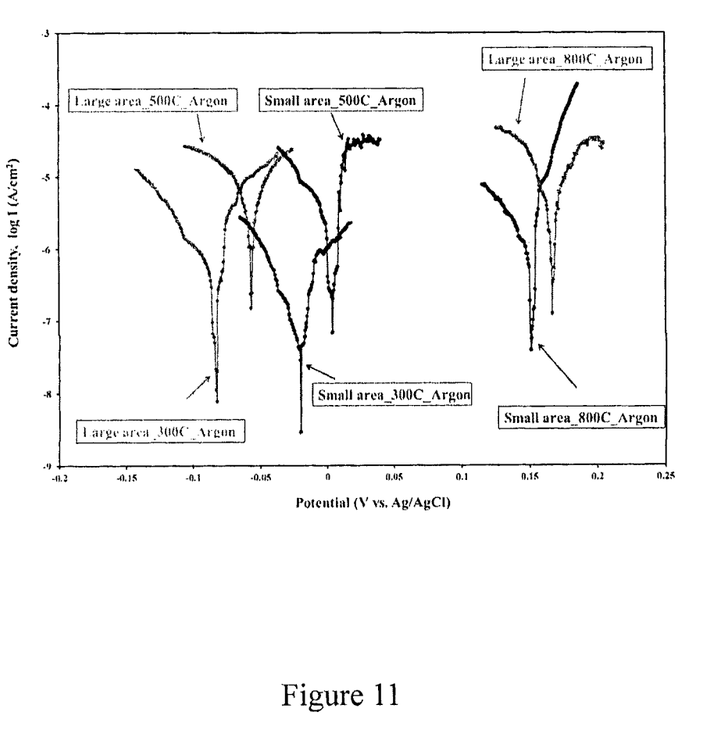
FIG. 11 is a graph showing a comparison of polarization curves of C-276 Hastelloy samples in $NaCl-KCl-ZnCl_2$ salt at different temperatures under argon atmosphere.

As shown in FIG. 11, the corrosion currents significantly decreased under anaerobic condition when compared with those measured under aerobic conditions (FIGS. 9 and 10). Moreover, these polarization currents measured under anaerobic condition slightly increased and the OCP shifted to more positive values as the salt temperature increased. It is practically impossible to completely remove all oxygen from the salt, so the positive shift in OCP is probably due the higher permeability of residual oxygen in the salt as the viscosity of the salt decreased with increasing temperature. Although there is positive shift in OCP values with increasing temperature under anaerobic conditions, all other things being equal, the OCP values measured under anaerobic conditions were still seen to be about 100 mV more negative than those OCP values measured under aerobic condition, particularly noticeable is the difference in OCPs for metal in aerobic and anaerobic molten salt at 800° C.

TABLE 5

Corrosion rates obtained from metal polarization in anaerobic salt (FIG. 25).

| Temperature (° C.)/ Atmosphere | Surface area for WE and CE | Corrosion potential, $E_{corr}$ (V) | Corrosion current density, $I_{corr}$ (μA/cm$^2$) | Corrosion rate, (μm/y) |
|---|---|---|---|---|
| 300 (Small) Argon | WE = 3.5 cm2 CE= 8.4 cm2 | −0.02 | 0.501 | 4.97 |
| 300 (Large) Argon | WE = 14 cm2 CE= 24.5 cm2 | −0.08 | 0.795 | 7.89 |
| 500 (Small) Argon | WE = 3.5 cm2 CE= 8.4 cm2 | 0.004 | 1.58 | 15.68 |
| 500 (Large) Argon | WE = 14 cm2 CE= 24.5 cm2 | −0.057 | 1.86 | 18.46 |
| 800 (Small) Argon | WE = 3.5 cm2 CE= 8.4 cm2 | 0.15 | 3.98 | 39.52 |
| 800 (Large) Argon | WE = 14 cm2 CE= 24.5cm2 | 0.166 | 3.16 | 31.37 |

As shown in table 5, the corrosion rates under anaerobic condition at 800° C. are about 50 times lower than the corrosion rates measured under aerobic conditions (Table 4) all other things being equal. It is also noted that corrosion rates of the small-sized sample are again very similar to those of the large-sized samples in anaerobic molten salt, which suggests that in these short term tests there is no dependency of corrosion rate on the metal size immersed in same salt mass (150 gm) as previously found on testing under aerobic conditions (Table 3).

It is important to note that the corrosion rates calculated by the electrochemical method (linear polarization technique) are in good agreement with the corrosion rates previously calculated by the gravimetric method. This strongly suggests that the corrosion rates are accurate as they give very similar values when they are determined by 2 different methods. This gravimetric method is considered inconvenient because it takes a long time to do but is considered accurate. The agreement of the electrochemical method to the gravimetric method indicates the electrochemical method is accurate and verifies two things i) the use of the linear polarization technique is reliable for estimating the corrosion rates of metals in molten salts at high temperatures up to 800° C. and ii) the newly developed silver/silver chloride reference electrode (SSE) is reliable for correctly estimating and controlling the potential in molten salts at high temperatures up to 800° C.

Example 7

Activation energy of corrosion under aerobic and anaerobic conditions in NaCl—KCl—ZnCl$_2$ molten salt as predicted by Arrhenius plots. The activation energy ($E_a$) of the corrosion process can be calculated from corrosion current densities ($I_{corr}$) at different temperatures according to the Arrhenius equation, which is $$\log I_{corr} = \frac{-E_a}{2.3RT} + \log A$$

where R is the gas constant (8.314 J/mol·K), A is Arrhenius constant and T is the absolute temperature. Activation energy was calculated from the slope of log $I_{corr}$ as a function of (1/T) plots.

TABLE 6

Arrhenius activation energy of the corrosion process of C-276 Hastelloy in NaCl—KCl—ZnCl$_2$ molten salt under aerobic and anaerobic conditions.

| Sample | Ea (kJ/mol) |
|---|---|
| Small area . . . Air | 42.37 |
| Large area . . . Air | 39.59 |
| Small area . . . Argon | 21.19 |
| Large area . . . Argon | 14.17 |

Figure 12:
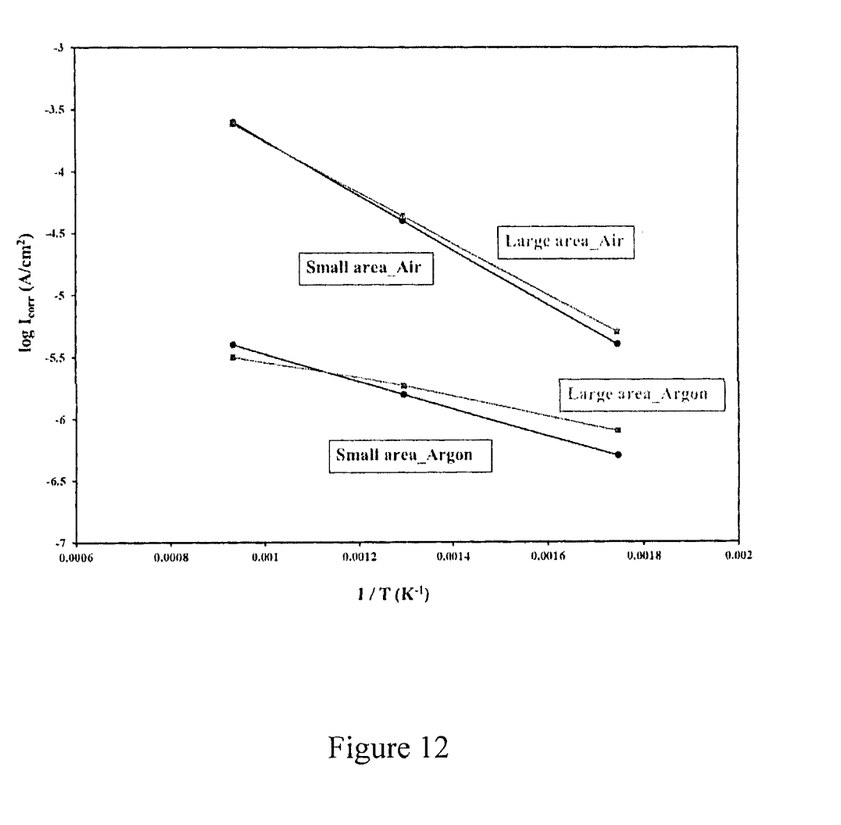
FIG. 12 is a graph showing log Icorr as a function of (1/T) of C-276 Hastelloy samples in NaCl—KCl—ZnCl$_2$ molten salt.

As shown in FIG. 12 and Table 6, the activation energy for corrosion under anaerobic conditions are almost half of values under aerobic conditions. This indicates that the corrosion rate has different dependency on temperature for aerobic and anaerobic conditions. It is clear that the corrosion rate is more dependent on temperature under aerobic condition than anaerobic conditions. This reflects the greater irreversibility of oxygen reduction compared to proton reduction on water (residual water is the thermodynamically weak oxidant in the salt equilibrated with Argon). Another consideration is that oxygen transport is strongly temperature dependent which agrees with viscosity measurement which show the viscosity of the molten salt is higher at low temperatures (300° C.) and is lower at higher temperatures (800° C.). Accordingly oxygen permeability is highest at 800° C. giving rise to highest corrosion rate and is very low at 300° C. giving rise to corrosion rate approaching anaerobic salt at 300° C., as is seen in FIG. 12.

The invention claimed is:

1. A reference electrode for use at high temperatures comprising:
   a tubular enclosure having a proximal end and a distal end, wherein said distal end comprises a junction for ionic conduction between the reference electrode and a working electrode;
   a non-porous insulating ceramic rod sealingly connected to said distal end of said enclosure to form micro-cracks between said ceramic rod and said enclosure at said junction;
   an electrolyte disposed inside of said enclosure, said electrolyte comprising silver chloride (AgCl) and potassium chloride (KCl);
   a sealing means for sealing said enclosure at said proximal end; and
   an electrical lead disposed in said electrolyte in said enclosure and extending through said sealing means at the proximal end of said enclosure.

2. The reference electrode of claim 1, wherein the enclosure is composed of heavy-walled quartz.

3. The reference electrode of claim 1, wherein the insulating ceramic rod is composed of alumina.

4. The reference electrode of claim 1, wherein the electrical lead is composed of silver.

5. A reference electrode for use at high temperatures comprising:
   a tubular enclosure inert to temperatures above 900° C. having an open proximal end and a closed distal end, wherein said closed distal end comprises a junction for ionic conduction between the reference electrode and a working electrode;
   a non-porous insulating ceramic rod fused to said opening at said closed distal end to form micro-cracks between said ceramic rod and said enclosure at said junction;
   an electrolyte disposed inside of said enclosure, said electrolyte comprising potassium chloride (KCl);
   a sealing means for sealing said enclosure at said proximal end; and
   an electrical lead disposed in said electrolyte in said enclosure and extending through said sealing means at the proximal end of said enclosure.

6. The reference electrode of claim 5, wherein the enclosure is composed of alumina.

7. The reference electrode of claim 5, wherein the insulating ceramic rod is composed of zirconia.

8. The reference electrode of claim 5, wherein the electrical lead is composed of tungsten.

9. A reference electrode for use at high temperatures comprising:
   a tubular enclosure having a proximal end and a distal end, wherein said distal end comprises a junction for ionic conduction between the reference electrode and a working electrode;
   a non-porous insulating ceramic rod sealingly connected to said distal end of said enclosure to form micro-cracks between said ceramic rod and said enclosure at said junction;
   an electrolyte disposed inside of said enclosure, said electrolyte comprising an alkaline metal salt;
   a sealing means for sealing said enclosure at said proximal end; and
   an electrical lead disposed in said electrolyte in said enclosure and extending through said sealing means at the proximal end of said enclosure, wherein the electrical lead is composed of silver.

10. The reference electrode of claim 9, wherein the enclosure is composed of heavy-walled quartz.

11. The reference electrode of claim 9, wherein the insulating ceramic rod is composed of alumina.

12. The reference electrode of claim 9, wherein the electrolyte comprises silver chloride (AgCl) and potassium chloride (KCl).

13. A reference electrode for use at high temperatures comprising:
   a tubular enclosure inert to temperatures above 900° C. having an open proximal end and a closed distal end, wherein said closed distal end comprises a junction for ionic conduction between the reference electrode and a working electrode;
   a non-porous insulating ceramic rod fused to said opening at said closed distal end to form micro-cracks between said ceramic rod and said enclosure at said junction;
   an electrolyte disposed inside of said enclosure, said electrolyte comprising an alkaline metal salt;
   a sealing means for sealing said enclosure at said proximal end; and
   an electrical lead disposed in said electrolyte in said enclosure and extending through said sealing means at the proximal end of said enclosure, wherein the electrical lead is composed of tungsten.

14. The reference electrode of claim 13, wherein the enclosure is composed of alumina.

15. The reference electrode of claim 13, wherein the insulating ceramic rod is composed of zirconia.

16. The reference electrode of claim 13, wherein the electrolyte comprises potassium chloride (KCl).

* * * * *